（12）United States Patent
Steury

(10) Patent No.: US 9,914,381 B2
(45) Date of Patent: Mar. 13, 2018

(54) SEATBACK, FLEXIBLE PANEL FOR SEATBACK AND METHOD

(71) Applicant: VEADA INDUSTRIES, INC., New Paris, IN (US)

(72) Inventor: Douglas V. Steury, New Paris, IN (US)

(73) Assignee: D.R.S. Co., LLC, New Paris, IN (US)

( * ) Notice: Subject to any disclaimer, the term of this patent is extended or adjusted under 35 U.S.C. 154(b) by 44 days.

(21) Appl. No.: 15/070,180

(22) Filed: Mar. 15, 2016

(65) Prior Publication Data

US 2017/0065086 A1    Mar. 9, 2017

Related U.S. Application Data

(60) Provisional application No. 62/213,758, filed on Sep. 3, 2015.

(51) Int. Cl.
*A47C 9/00* (2006.01)
*B60N 2/68* (2006.01)
*A47D 1/00* (2006.01)
*A47C 7/46* (2006.01)
*A47C 7/42* (2006.01)

(52) U.S. Cl.
CPC ............. *B60N 2/686* (2013.01); *A47C 7/425* (2013.01); *A47C 7/465* (2013.01); *A47D 1/004* (2013.01)

(58) Field of Classification Search
CPC ....................................... A47D 1/004
USPC ............ 297/452.36, 452.29, 452.56, 452.14, 297/230.11, 440.2
See application file for complete search history.

(56) References Cited

U.S. PATENT DOCUMENTS

| 614,153 A * | 11/1898 | West | B60N 2/4879 297/230.11 |
| 8,876,206 B2 * | 11/2014 | Yamaguchi | B60N 2/4228 297/230.12 |
| 2004/0000804 A1 * | 1/2004 | Groth | A61G 5/12 297/284.4 |

* cited by examiner

*Primary Examiner* — Syed A Islam
(74) *Attorney, Agent, or Firm* — Michael A. Myers

(57) ABSTRACT

A new easy-assemble seatback includes a seatback frame adapted to be connected to a seat. The seat back frame has a pair of opposite sides. The frame supports at least two flexible panels from a top panel connection so the panels hang and rotate freely from the connection on the frame. The panels are formed from a flexible material which may include wood, metal, metal alloy or plastic. Panel-to-frame assembly is done by hand. The frame includes a stop member connected to the frame that impedes free rotation of the flexible panels. Since the panels cover most all of the load bearing seatback area, fewer metal supportive elements are necessary. The new seatback is longer lasting, lighter in weight and more deployable as a result.

10 Claims, 4 Drawing Sheets

SEATBACK, FLEXIBLE PANEL FOR SEATBACK AND METHOD

REFERENCE TO RELATED APPLICATION

This application claims priority to U.S. application Ser. No. 62/213,758, filed Sep. 3, 2015, which is hereby incorporated by reference.

BACKGROUND OF THE INVENTION

Field of the Invention

The present invention relates generally to the field of furniture pieces and, more particularly, to an improved seatback, a flexible panel for a seatback and a method of making a seatback.

Description of Related Art

Seating apparatus often include a seat with an upstanding seatback connected to the seat to provide added comfort. Seatbacks typically comprise a frame with vertical and/or horizontal supports. The structural elements are typically rigid and many are formed from steel. This means prior seatbacks can be heavy and uncomfortable. Foam and other materials that might add comfort add to product cost. Additionally, seats for vehicular and watercraft applications, for example, where weight influences design features, are labor intensive because most seatbacks have to be welded together or assembled to produce a sturdy regulatory compliant piece.

Besides slow manufacturing and assembly, current seatback structures tend to be heavy and non-deployable. Their elasticity also degrades through repeated stresses and load bearing. Some metal seatback frames rust and eventually break down as well. This is especially the case in marine and vehicular applications.

Thus, an improved seatback, a flexible panel for a seatback that is durable with load bearing versatility and a method of making such an improved seatback are highly desirable. Such a seatback design should have fewer metal parts for easy rapid manufacture, be lightweight and deployable, rigid with dynamic reinforcement, and possess longer useful life.

SUMMARY OF THE INVENTION

The invention provides a new seatback design with parts that may be assembled by hand. Besides taking less time to manufacture, the new seatback is lighter and more deployable because of its unique combination of structural and material elements. One embodiment of the seatback includes a seatback frame adapted to be connected to a seat. The seatback frame has a pair of opposite sides. A panel support extends between and connects at opposite ends, respectively, to the sides of the frame. At least two flexible panels are provided. Each panel includes an elongate single piece body with a top, a bottom, a front side, and a backside. The top of the body shaped along its entire length to define a barrel. The backside of the top provides a bearing surface inside the barrel. Each of the barrels also has a channel opening for receiving the panel support so that the flexible panels may be connected to the panel support of the frame by hand. The flexible panels are noncontiguous and each panel, therefore, is freely rotatable relative to the other on the panel support. And a stop member is connected to the frame for impeding movement of the flexible panels relative to the seatback frame.

In another embodiment of the invention, there is a method of making a seatback, which includes the steps of: (i) providing a rigid seatback frame with a panel support. The seatback frame is adapted to be connected to a seat; (ii) providing at least two flexible panels. Each panel comprises an elongate single piece body with a top, a bottom, a front side and a backside. The top of the body is shaped along its entire length to define a barrel that the backside of the top of the panel provides a bearing surface inside the barrel. Each barrel also has an opening for receiving the panel support; (iii) connecting the panels to the panel support by hand by inserting the panel support through the opening in the barrel of each panel so the flexible panels are noncontiguous and each panel may rotate freely relative to the other on the support; and (iv) connecting a stop member to the frame to impede the rotation of the panels on the panel support.

In another embodiment of the invention, there is a method of making a seatback, which includes the steps of: (i) providing a rigid seatback frame with a panel support. The seatback frame is adapted to be connected to a seat; (ii) providing at least one flexible panel with a top fastener portion; (iii) connecting the fastener portion of the panel by hand to the panel support so the flexible panel may rotate freely from the support; and (iv) connecting a stop member to the frame to impede the rotation of the panel on the panel support.

The flexible panel is formed from a material selected from the group consisting of wood, metal, metal alloy or plastic.

In some embodiments, the panel is formed from a thermoplastic composite material.

In one embodiment, the panel has a tensile strength between about 37 and 38 N/mm$^2$ and a flex modulus of about 600 ksi.

In some embodiments, the panel has an arcuate shape along its length.

It is an object of the present invention to provide a new and improved seatback. It is another object of the invention to provide a flexible panel for a seatback that is durable with load bearing versatility and a method of making such an improved seatback.

Related objects and advantages of the present invention will be apparent from the following description.

DETAILED DESCRIPTION OF INVENTION

Figure 1:
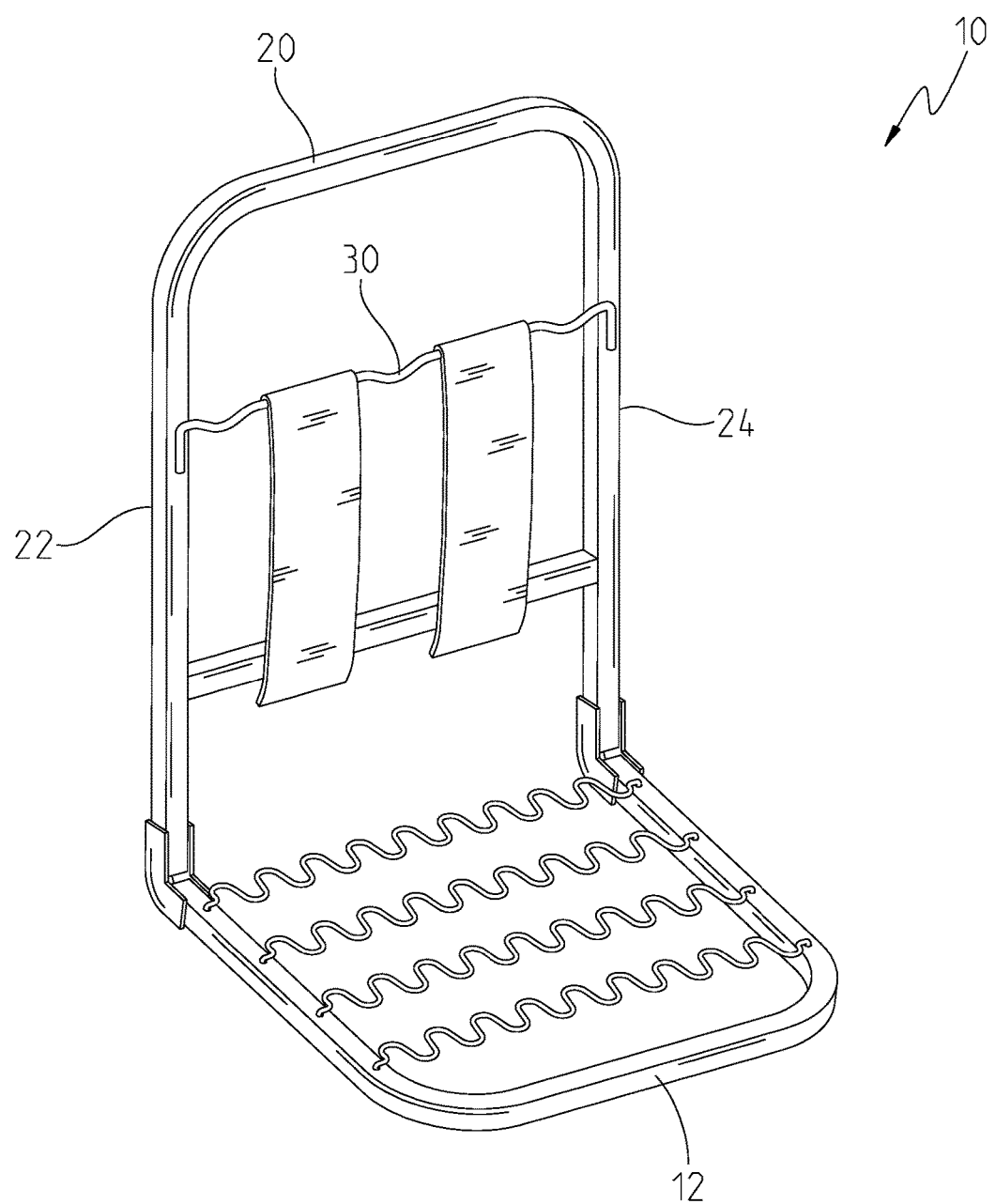
FIG. 1 is an isometric view of a furniture piece showing an embodiment of the seatback of the invention connected to a seat.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device(s) and such further applications of the principles of the inventions as illustrated therein being contemplated as would normally occur to one skilled in the art to which the invention relates.

Figure 2:
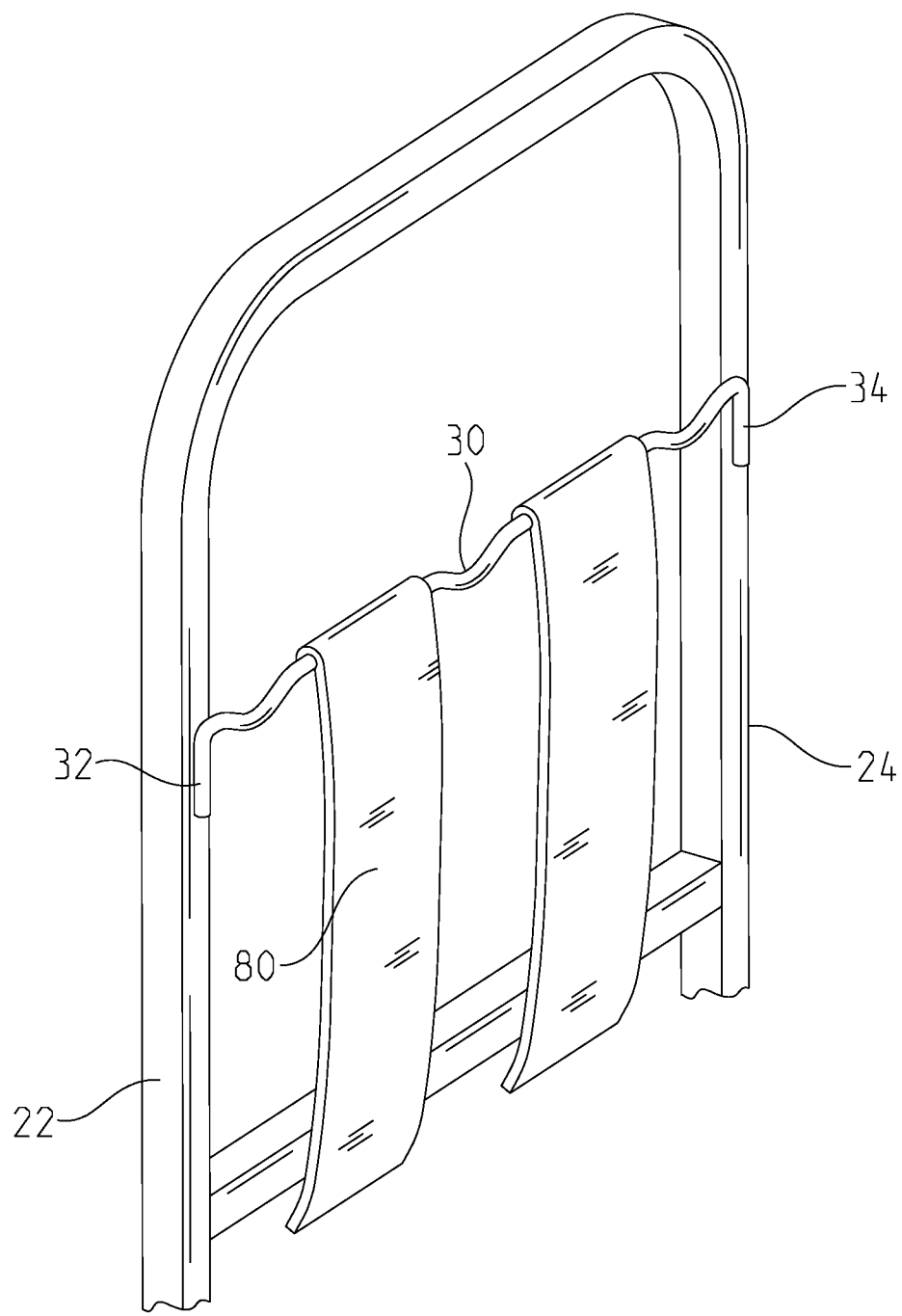
FIG. 2 is a front side perspective view of an embodiment of the seatback of the invention.
Figure 3:
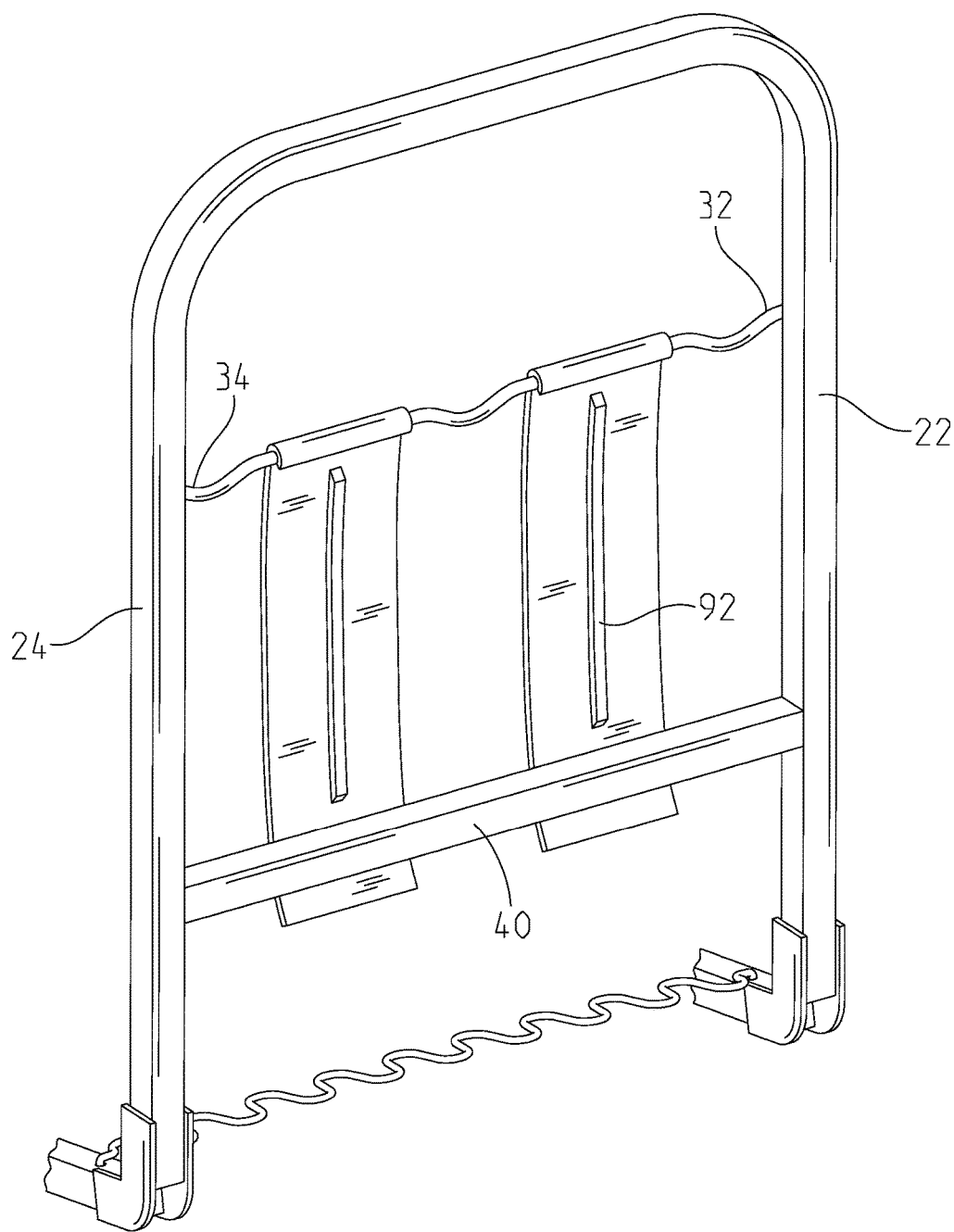
FIG. 3 is a back side perspective view of an embodiment of the seatback of the invention.

Generally, the seatback 10 has a seatback frame 20 adapted to be connected to a seat 12, as shown in FIG. 1. The seat of FIG. 1 is provided to illustrate the advantages of Applicant's new seatback and panel structures. Skilled artisans should recognize that many different seat frames and seats can incorporate Applicant's new seatback design. The embodiment in the figures, therefore, should not be construed as limiting the useful applications of the invention. Referring to FIGS. 1-3, the exemplary embodiment of the seat back frame has a pair of opposite sides 22, 24. A panel support 30 with opposite ends 32, 34 extends between and is connected to the sides 22, 24 of the frame. In some embodiments, the panel support is integrated into the frame, and the panel support is part of the frame.

Preferably, the seatback frame 20 is formed from tube steel, and a steel panel support 30 and stop member 40 are welded to the sides of the frame 20. Other rigid materials, including metals and alloys suitable for the application disclosed at the time of this writing and which are readily available to skilled artisans my be utilized to make the seatback frame 20, panel support 30 and stop member 40. In some embodiments, the stop member is integrated into the frame. In other embodiments, the stop member 40 does not extend the full distance between the sides 22, 24 of the frame 20.

Figure 4:
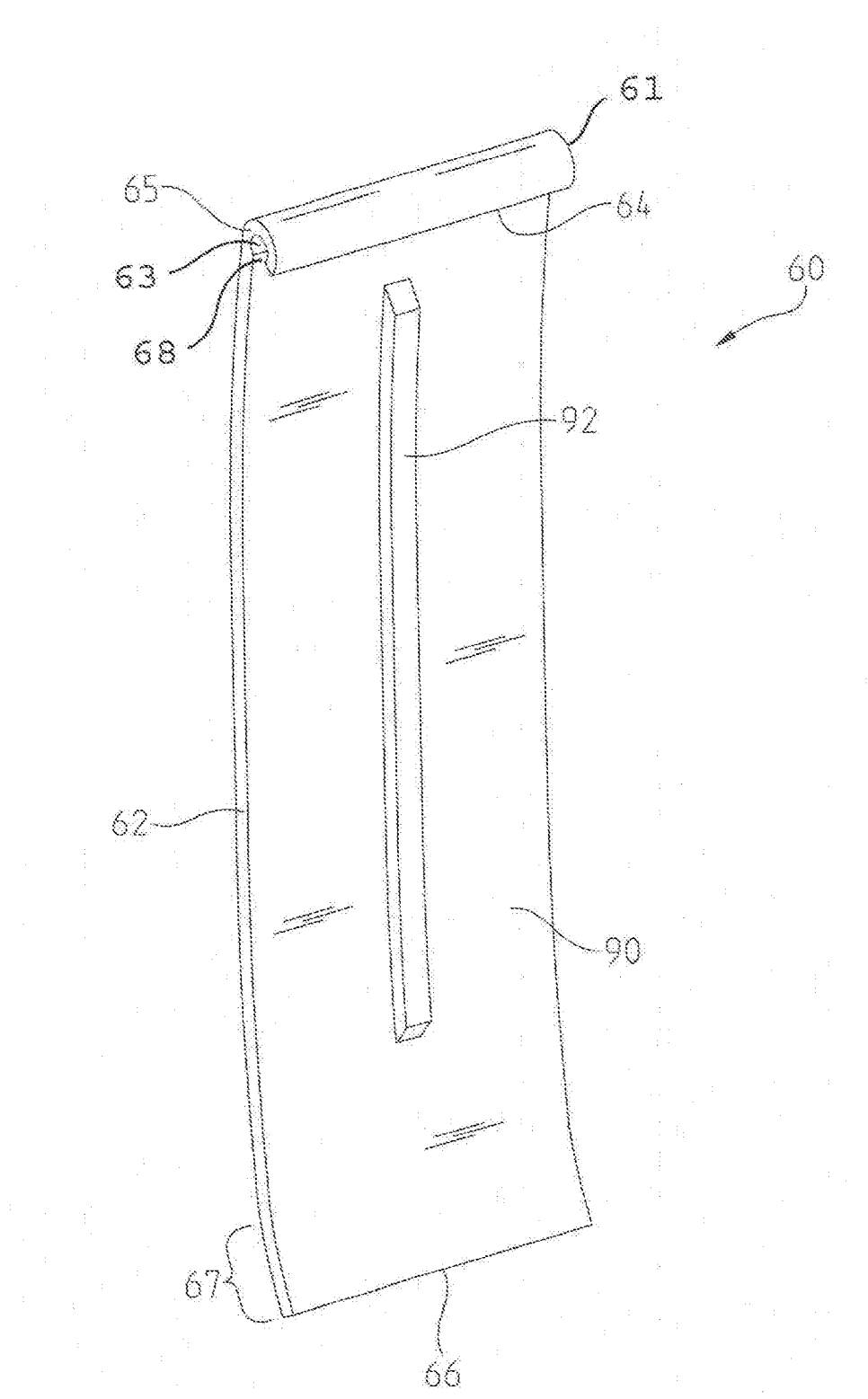
FIG. 4 is a back side perspective view of an embodiment of the flexible panel of the invention.

With reference to FIG. 4, in one embodiment, the novel flexible panel 60 has an elongate body 62, a top 64 and a bottom 66. In some embodiments, the body 62 has an arcuate shape along its length. The top 64 has a fastener, preferably a barrel hinge connector 65, which includes a barrel 61, an opening 68 and a backside bearing surface 63 for connecting flexible panel 60 to the panel support 30 so that the flexible panel may rotate freely on the panel support. In this description hinge connector means any loose fitting connection that enables the panel to swing freely from the panel support in a single-plane axis. A barrel type hinge connector is shown by example. Other known fasteners, however, such as snap-fit, latching, mating-type or the like, may be used to join the panel 60 with the seatback frame 20 so long as the panel(s) 60 can freely rotate on the panel support 30. In the embodiment shown, two panels 60 are installed in spaced apart fashion on the seatback frame 20 so they are noncontiguous (FIGS. 1-2). In some embodiments, a single panel is employed. In other embodiments, a plurality of panels 60 are used.

In some embodiments, the bottom 66 of the panel has a sloped portion 67, which rests against a stop member 40 connected to and extending between the sides 22, 24 of the frame 20. The panel 60 thus provides a slightly outwardly protruding flexible load bearing front side 80 for the seatback. Panel 60 is therefore rigid with dynamic reinforcement.

In one embodiment, the flexible panel 60 is a elongate single piece body that includes a top 64, a bottom 66, a front side or upper mold piece 80, a back side or lower mold piece 90, and a central reinforcing axial rib 92 formed on or in the back side 90. As best shown in FIGS. 3-4, the top 64 of the body is shaped along its entire length to define a barrel 61. In that embodiment, backside 90 of the ton of panel 60 provides a bearing surface 63 inside barrel 61, upon which the panel support 30 bears. Panels 60 are positioned onto the support 30 by hand by inserting support member through the channel opening 68 in the barrel. The flexible panel may be formed from stress treated wood, metal, such as rolled steel or the like, metal alloy or other material of a suitable thickness/gauge to yield the desired flexible properties. Applications employing wood include wood additives to increase life and flexibility of the wood. In some embodiments the flexible panel 60 is formed from one of numerous known thermoplastic polymeric materials and methods. Fiber-reinforced polymers (FRPs), shape memory polymer composites and high strain composites are examples.

In the preferred embodiments, the panel 60 is molded from a commercially produced glass-filled Polypropylene copolymer composite material having a silica/ash content of between about 19-24 percent, a tensile strength between about 37 and 38 N/mm$^2$ using Active Standard ASTM D638 and a flex modulus of about 600 ksi using test standard D790.

Since the panel(s) 60 of the invention covers most all of the load bearing seatback area, fewer metal supportive and fastening elements are necessary. And the improved seatback 10 is longer lasting, lighter in weight and more deployable as a result. Because during manufacture of the seatback flexible panel(s) 60 may be placed onto the panel support by hand, e.g., snap-fit, mating, and latching, the inventor has achieved especially rapid manufacturing times for the subject seats. No welding is required.

For the purposes of promoting an understanding of the principles of the invention, specific embodiments have been described. It should nevertheless be understood that the description is intended to be illustrative and not restrictive in character, and that no limitation of the scope of the invention is intended. Any alterations and further modifications in the described components, elements, processes, or devices, and any further applications of the principles of the invention as described herein, are contemplated as would normally occur to one skilled in the art to which the invention relates.

The invention claimed is:

1. A seatback comprising:
    a seatback frame adapted to be connected to a seat, the seat back frame having a panel support;
    at least two flexible panels, each panel comprising, an elongate single piece body with a top, a bottom, a front side, and a backside, the top of the body is shaped along its entire length to define a barrel, said backside of the top of the body providing a bearing surface inside said barrel, each of the barrels also has an opening for receiving the panel support so that the flexible panels may be connected to the panel support of the frame by hand, the flexible panels are noncontiguous and each of the panels is thus freely rotatable relative to the other on said support; and
    a stop member connected to the frame for impeding movement of the flexible panels relative to the seatback frame.

2. The seatback of claim 1, in which the flexible panels are formed from a thermoplastic composite material.

3. The seatback of claim 1, in which the flexible panels are formed from a material selected from the group consisting of wood, metal, metal alloy and plastic.

4. The seatback of claim 2, in which each of the flexible panels has a central reinforcing axial rib formed on the backside.

5. The seatback of claim 2, in which each of the flexible panels has a tensile strength between about 37 and 38 N/mm$^2$ and a flex modulus of about 600 ksi.

6. The seatback of claim 4, in which each of the flexible panels has a tensile strength between about 37 and 38 N/mm$^2$ and a flex modulus of about 600 ksi.

7. A method of making a seatback comprising the steps of:
providing a rigid seatback frame having a panel support, said seatback frame being adapted to be connected to a seat;
providing at least two flexible panels each having an elongate single piece body with a top, a bottom, a front side, and a backside, the top of the body is shaped along its entire length to define a barrel so that the backside of the top of the panel provides a bearing surface inside the barrel, each of the barrels also has an opening for receiving the panel support;
connecting the panels to the guard support by hand by inserting the panel support through the opening in the barrel of each panel so the flexible panels are noncontiguous and each panel may rotate freely relative to the other on said support; and
connecting a stop member to the frame to impede the rotation of each of the respective panels on the panel support.

8. A method according to claim 7, in which the flexible panels are formed from a material selected from the group consisting of wood, metal, metal alloy or plastic.

9. A method according to claim 7, in which the flexible panels are formed from a thermoplastic polymeric material.

10. The method of claim 9, in which each of the flexible panels has a tensile strength between about 37 and 38 N/mm$^2$ and a flex modulus of about 600 ksi.

\* \* \* \* \*